(12) United States Patent
Hague et al.

(10) Patent No.: US 12,184,196 B2
(45) Date of Patent: Dec. 31, 2024

(54) VOLTAGE CONVERTER WITH THYRISTOR GATE CONTROLLED TO CONDUCT A REVERSE CURRENT

(71) Applicant: STMicroelectronics (Tours) SAS, Tours (FR)

(72) Inventors: Yannick Hague, Mettray (FR); Romain Launois, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 191 days.

(21) Appl. No.: 17/903,214

(22) Filed: Sep. 6, 2022

(65) Prior Publication Data

US 2023/0074505 A1    Mar. 9, 2023

(30) Foreign Application Priority Data

Sep. 8, 2021   (FR) ...................................... 2109385

(51) Int. Cl.
*H02M 7/219*       (2006.01)
*H02M 1/00*        (2007.01)
(Continued)

(52) U.S. Cl.
CPC ............ *H02M 7/1623* (2013.01); *H02M 1/08* (2013.01); *H02M 7/219* (2013.01); *H02M 7/757* (2013.01)

(58) Field of Classification Search
CPC ..... H02M 7/1623; H02M 7/757; H02M 7/219
See application file for complete search history.

(56) References Cited

U.S. PATENT DOCUMENTS

2015/0131343 A1    5/2015  Hufnagel et al.
2016/0373021 A1*  12/2016  Gonthier ............. H02M 1/4208
(Continued)

FOREIGN PATENT DOCUMENTS

CN    112054665 A  * 12/2020  ............. H02M 1/32
CN    113726135 A    11/2021
(Continued)

OTHER PUBLICATIONS

INPI Search Report and Written Opinion for priority application, FR 2109385, report dated May 23, 2022, 8 pgs.
(Continued)

*Primary Examiner* — Sisay G Tiku
(74) *Attorney, Agent, or Firm* — Crowe & Dunlevy LLC

(57) ABSTRACT

A converter includes first and second transistors coupled between first and second nodes, and first and second thyristors coupled between the first and second nodes. The converter is controlled for operation to: in first periods, turn the first transistor and second thyristor on and turn the second transistor and the first thyristor off, and in second periods, turn the first transistor and the second thyristor off and turn the second transistor and the first thyristor on. Further control of converter operation includes, for a third period following each first period, turning the first and second transistors off, turning the second thyristor off, and injecting a current into the gate of the first thyristor. Additional control of converter operation includes, for a fourth period following each second period, turning the first and second transistors off, turning the first thyristor off, and injecting a current into the gate of the second thyristor.

21 Claims, 4 Drawing Sheets

(51) Int. Cl.
*H02M 1/08* (2006.01)
*H02M 7/162* (2006.01)
*H02M 7/757* (2006.01)

(56) References Cited

U.S. PATENT DOCUMENTS

| | | | |
|---|---|---|---|
| 2017/0324350 A1* | 11/2017 | Gonthier | H02M 1/081 |
| 2019/0006959 A1* | 1/2019 | Benabdelaziz | H02M 7/81 |
| 2019/0006960 A1* | 1/2019 | Benabdelaziz | H02M 7/797 |
| 2020/0381992 A1* | 12/2020 | Gonthier | H02M 7/1557 |
| 2020/0403525 A1* | 12/2020 | Miyazaki | H02M 1/0085 |
| 2021/0135590 A1* | 5/2021 | Hague | H02M 1/0085 |
| 2021/0336533 A1* | 10/2021 | Benabdelaziz | H02M 7/12 |
| 2022/0103062 A1* | 3/2022 | Benabdelaziz | H02M 7/12 |
| 2022/0255453 A1* | 8/2022 | Nakata | H02M 7/125 |
| 2022/0360190 A1* | 11/2022 | Gonthier | H02M 1/4208 |

FOREIGN PATENT DOCUMENTS

| | | | | |
|---|---|---|---|---|
| EP | 3422554 | * | 1/2019 | H02M 7/757 |
| EP | 3422554 A1 | | 1/2019 | |

OTHER PUBLICATIONS

NXP Semiconductors: "Totem-Pole Bridgeless PFC Design Using MC56F82748," Document No. DRM174, Nov. 2016, 43 pgs.

STMicroelectronics: "Totem-Pole PFC Reference Design With SiC Technology," Jul. 3, 2020, XP055923299, 25 pgs.

Infineon, "3300 W CCM bi-directional totem pole with 650 V CoolSiC(tm) and XMC(tm)," Jan. 14, 2020, http://www.infineon.com/eval-3k3w-tp-pfc-sic, 34 pgs.

TI Designs: TIDA-01604, "98.6% Efficiency, 6.6-kW Totem-Pole PFC Reference Design for HEV/EV Onboard Charger," Apr. 2020, 71 pgs.

* cited by examiner

VOLTAGE CONVERTER WITH THYRISTOR GATE CONTROLLED TO CONDUCT A REVERSE CURRENT

TECHNICAL FIELD

This application claims the priority benefit of French Application for Patent No. 2109385, filed on Sep. 8, 2021, the content of which is hereby incorporated by reference in its entirety to the maximum extent allowable by law.

TECHNICAL FIELD

The present disclosure generally concerns electronic devices and, in particular, voltage converters. More precisely, the present disclosure concerns AC/DC voltage converters and their control methods.

BACKGROUND

Voltage converters may be of a plurality of types.

A rectifier, also called AC/DC converter or Graetz bridge, is a converter configured to power a load which requires being powered with a voltage and a current both as direct as possible, from an AC voltage source. The power supply is, most often, a voltage generator.

A power inverter is a power electronics device enabling to generate AC voltages and currents from an electric power source having a different voltage or frequency.

There is a need in the art to overcome all or part of the disadvantages of known voltage converters.

SUMMARY

An embodiment provides a voltage converter comprising first and second transistors series-coupled between first and second nodes, and first and second thyristors series-coupled between the first and second nodes. The converter is configured to operate in a manner where: in first periods, the first transistor and the second thyristor are on and the second transistor and the first thyristor are off, and in second periods, the first transistor and the second thyristor are off and the second transistor and the first thyristor are on, and wherein at least certain first periods are followed by a third period during which the first and second transistors are off, the second thyristor is off, and a current is injected into the gate of the first thyristor, and wherein each second period is followed by a fourth period during which the first and second transistors are off, the first thyristor is off, and a current is injected into the gate of the second thyristor.

Another embodiment provides a method of controlling a voltage converter comprising first and second transistors series-coupled between first and second nodes, and first and second thyristors series-coupled between the first and second nodes, the method comprising: during first periods, controlling the first transistor and the second thyristor to be on and the second transistor and the first thyristor to be off, and during second periods controlling the first transistor and the second thyristor to be off and the second transistor and the first thyristor to be on. The method further comprises, during a third period following at least certain first periods, injecting current into the gate of the first thyristor while the first and second transistors are off and the second thyristor is off. The method further comprises, during a fourth period following each second period, injecting a current into the gate of the second thyristor while the first and second transistors are off and the first thyristor is off.

According to an embodiment, the converter is configured so that the current injected into the gate of the first thyristor, in the third period, is in the range from 20 mA to 200 mA. The converter is further configured so that the current injected into the gate of the second thyristor, in the fourth period, is in the range from 20 mA to 200 mA.

According to an embodiment, the cathode of the first thyristor is coupled to the first node and the anode of the first thyristor is coupled to a third node. According to an embodiment, the cathode of the second thyristor is coupled to the third node and the anode of the second thyristor is coupled to the second node.

According to an embodiment, a conduction terminal of the first transistor is coupled to the first node, and another conduction terminal of the first transistor is coupled to a fourth node. According to an embodiment, a conduction terminal of the second transistor is coupled to the fourth node, and another conduction terminal of the second transistor is coupled to the second node.

According to an embodiment, the converter comprises an inductor coupled between the fourth node and a fifth node.

According to an embodiment, the converter comprises third and fourth thyristors series-coupled between the first and second node.

According to an embodiment, the cathode of the third thyristor is coupled to the third node and the anode of the third thyristor is coupled to the first node and the cathode of the fourth thyristor is coupled to the second node and the anode of the fourth thyristor is coupled to the third node.

According to an embodiment, the converter is configured to operate in a manner where: in fifth periods, the second transistor and the third thyristor are on and the first transistor and the first, second, and fourth thyristors are off, and in sixth periods, the first transistor and the fourth thyristor are on, and the second transistor and the first, second, and third thyristors are off.

According to an embodiment, the converter is configured so that at least certain fifth periods are followed by the fourth period and at least certain sixth periods are followed by the third period.

According to an embodiment, the converter is configured so that an AC voltage is applied between the third node and the fifth node.

According to an embodiment, the converter is configured so that a DC voltage is applied between the first and second nodes.

According to an embodiment, the converter comprises a capacitor coupled between the first and second nodes.

According to an embodiment, the first and second transistors are MOSFET transistors.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
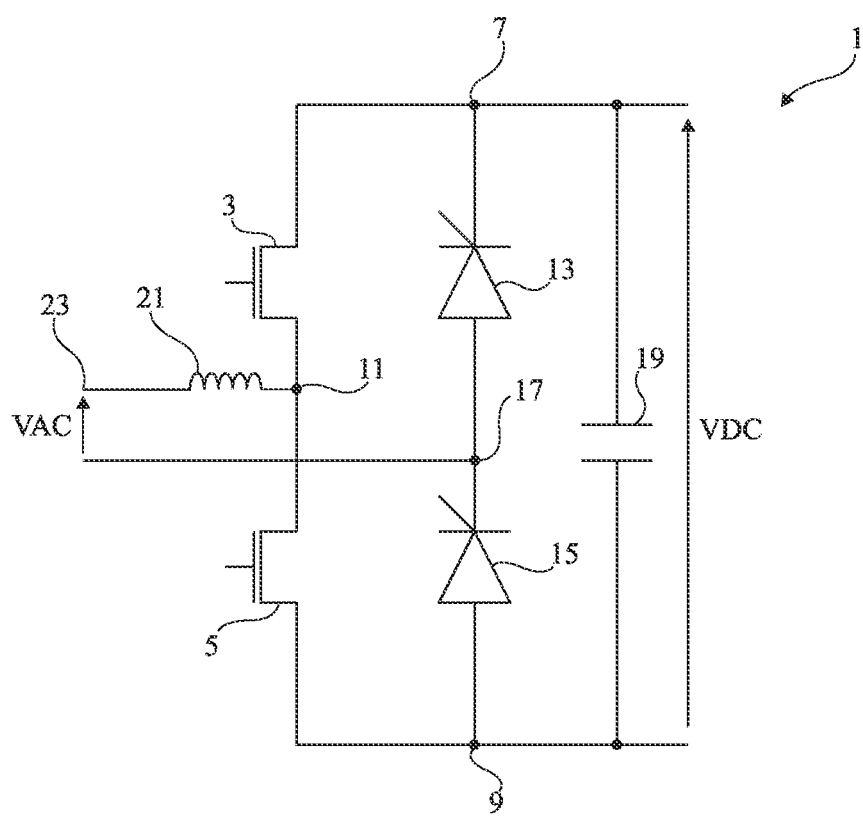
FIG. 1 shows an embodiment of an AC/DC voltage converter.

FIG. 1 shows an embodiment of an AC/DC voltage converter 1, or converter circuit. Converter circuit 1 is, for example, a unidirectional circuit, for example, a rectifier. Converter circuit 1 is, for example, a power factor correction (PFC) circuit. Converter circuit 1 is, for example, a "totem pole" type power factor correction circuit. Converter circuit 1 is configured to receive an AC voltage VAC as an input and to output a DC voltage VDC.

Converter circuit 1 comprises two transistors 3 and 5. Transistors 3 and 5 are, for example, insulated-gate field-effect transistors (MOSFET), for example, an N-type MOSFET. Preferably, transistors 3 and 5 are configured for operation at a high frequency, that is, higher than 10 kHz. Transistors 3 and 5 are series-coupled between a node 7 and a node 9. More precisely, transistor 3 is coupled between node 7 and a node 11 by its (source and drain) conduction terminals and transistor 5 is coupled between node 11 and node 9 by its (source and drain) conduction terminals. Node 11 thus forms a junction node or point of transistors 3 and 5. In other words, a conduction terminal of transistor 3, for example, the drain, is coupled, preferably connected, to node 7 and another conduction terminal of transistor 3, for example, the source, is coupled, preferably connected, to node 11. A conduction terminal of transistor 5, for example, the drain, is coupled, preferably connected, to node 11 and another conduction terminal of transistor 5, for example, the source, is coupled, preferably connected, to node 9. Node 9 is, for example, a node of application of a reference voltage GND, for example, the ground.

Transistors 3 and 5 are controlled by one or a plurality of control circuits. Thus, each transistor comprises a control terminal coupled, preferably connected, to a control circuit generating a transistor control voltage which is applied to the transistor gate.

Converter circuit 1 comprises two thyristors, or silicon controlled rectifiers (SCR), 13 and 15. Thyristors 13 and 15 are series-coupled between nodes 7 and 9. More precisely, thyristor 13 is coupled between node 7 and a node 17 and thyristor 15 is coupled between node 17 and node 9. Node 17 thus forms a junction node or point of thyristors 13 and 15. In other words, the cathode of thyristor 13 is coupled, preferably connected, to node 7 and the anode of thyristor 13 is coupled, preferably connected, to node 17. The cathode of thyristor 15 is coupled, preferably connected, to node 17 and the anode of the thyristor is coupled, preferably connected, to node 9. The cathode of thyristor 15 is thus coupled, preferably connected, to the anode of thyristor 13.

Thyristors 13 and 15 are controlled by one or a plurality of control circuits. Thus, each thyristor comprises a control terminal, or gate, coupled, preferably connected, to a control circuit generating a thyristor control current. Thyristors 13 and 15 in this embodiment are of a cathode-gate type.

Converter circuit 1 further comprises a capacitor 19 coupled between terminals 7 and 9. In other words, a terminal of capacitor 19 is coupled, preferably connected, to node 7 and another terminal of the capacitor is coupled, preferably connected, to node 9.

Converter circuit 1 thus comprises three branches coupled in parallel. One branch of converter circuit 1 comprises series-coupled transistors 3 and 5. Another branch of converter circuit 1 comprises series-coupled thyristors 13 and 15. Another branch of converter circuit 1 comprises capacitor 19.

Converter circuit 1 further comprises an inductor 21. Inductor 21 is coupled between node 11 and a node 23. In other words, a terminal of inductor 21 is coupled, preferably connected, to node 11 and the other terminal of inductor 21 is coupled, preferably connected, to node 23.

AC voltage VAC is applied between nodes 23 and 17. Nodes 23 and 17, for example, form AC input nodes. DC voltage VDC is delivered between nodes 7 and 9. Voltage VDC, for example, is the voltage across capacitor 19. Nodes 7 and 9, for example, form the DC output nodes of converter circuit 1.

The operation of the embodiment of FIG. 1 is described in further detail in relation with FIGS. 2A, 2B and 3A, 3B.

Figure 2A:
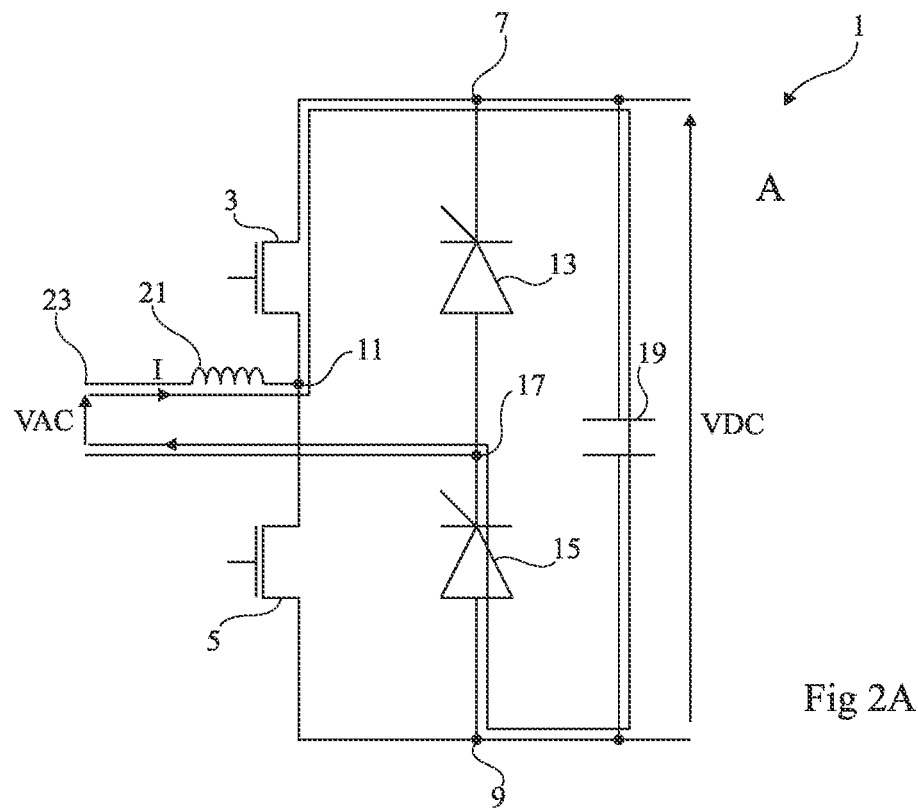
FIGS. 2A-2B schematically show two steps of a method of controlling the embodiment of FIG. 1.
Figure 2B:
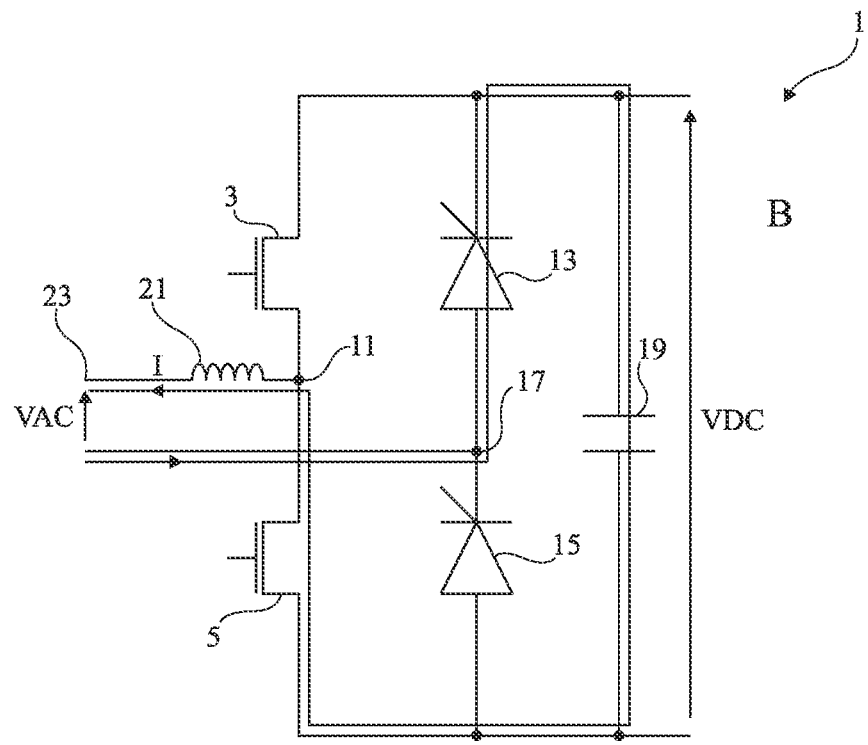

FIGS. 2A, 2B schematically show two steps of a control method of the embodiment of FIG. 1. More precisely, FIG. 2A, 2B each show a step of the method of controlling converter circuit 1. The steps illustrated in FIGS. 2A and 2B, are referred to herein as steps A and B, are repeated and alternated during the operation of converter circuit 1.

The path of the current is shown in FIGS. 2A, 2B by an arrowed path.

The step illustrated in FIG. 2A corresponds to periods of time during which voltage VAC is positive. A current I flowing through the inductor is positive, that is, flowing from node 23 to node 11.

During the periods of time for the step illustrated in FIG. 2A, transistor 3 is on and transistor 5 is off. Thyristor 13 is off, that is, the current on the gate of thyristor 13 is at a value which does not enable the current to flow through thyristor 13, for example, substantially zero. Thyristor 15 is on, that is, the current on its gate is such that a current can flow through the thyristor. For example, the current on the gate of thyristors 15 is greater than the gate trigger current (IGT), for example, in the order of 50 mA. Thus, the current flows, from node 23, through inductor 21, transistor 3, capacitor 19, and thyristor 15, to reach node 17. The voltage between nodes 7 and 9 is thus positive and the capacitor is charged to maintain the value of DC voltage VDC.

The step illustrated by FIG. 2B corresponds to periods of time during which voltage VAC is negative. The current I flowing through the inductor is negative, that is, flowing from node 11 to node 23.

During the periods of time for the step illustrated in FIG. 2B, transistor 5 is on and transistor 3 is off. The current on the gate of thyristors 13 is, for example, greater than the gate trigger current (IGT), for example, in the order of 50 mA. Thus, the current flows, from node 17, through thyristor 13, capacitor 19, and transistor 5, to reach node 11 and reach node 23 through inductor 21. The voltage between nodes 7 and 9 is thus positive and the capacitor is charged to maintain the value of DC voltage VDC.

Figure 3A:
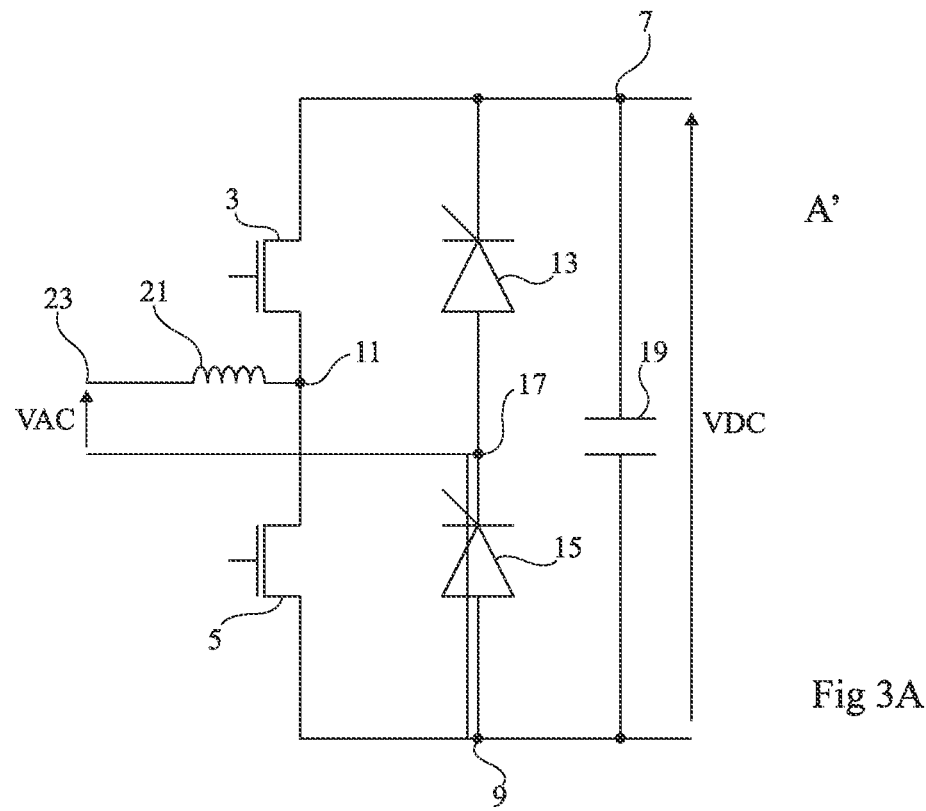
FIGS. 3A-3B schematically show two other steps of a method of controlling the embodiment of FIG. 1.
Figure 3B:
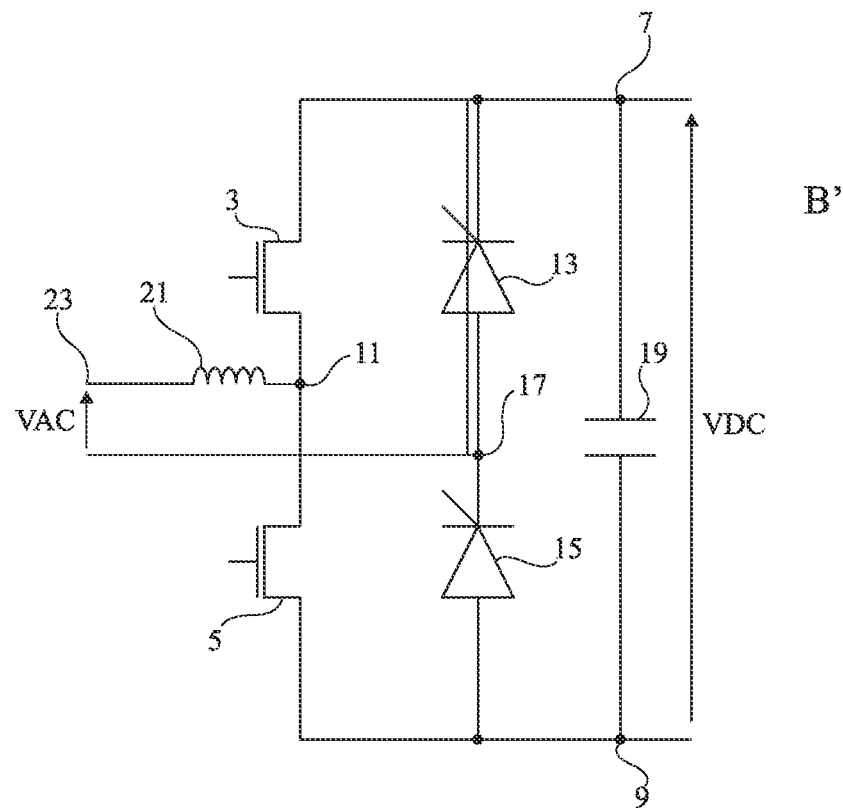

FIGS. 3A, 3B schematically show two other steps of a control method of the embodiment of FIG. 1. More precisely, FIGS. 3A, 3B each representing a step of the control method of converter circuit 1. More precisely, a step illustrated by FIG. 3A, referred to herein as step A', is carried out for a period of time between the periods of time for steps illustrated by FIG. 2B and FIG. 2A. That is, after step B and before step A. A step illustrated by FIG. 3B, referred to herein as step B', is carried out for a period of time between the periods of time for steps illustrated by FIG. 2A and FIG. 2B. That is, after step A and before step B. Thus, the circuit control method comprises the repetition, in this order, of steps A, B', B, and A'.

At the end of the period of time for step A and at the beginning of the period of time for step B', the voltage on node 17 is substantially equal to the voltage on node 9, that is, the reference voltage, for example, the ground. The voltage across thyristor 13 is negative. In other words, the voltage on the cathode of thyristor 13 is greater than the voltage on the anode of thyristor 13.

During the period of time for step B', the circuit uses a characteristic of thyristors according to which, when the voltage across a thyristor is negative, that is, when the voltage on the thyristor cathode is greater than the voltage on the thyristor anode, and a positive current is injected into the gate, the thyristor behaves as a bipolar transistor having a low current gain. The thyristor can then conduct current in reverse.

Thus, during the period of time for step B', a current is injected into the gate of thyristor 13, which thus conducts a low current. The injected current is, for example, in the range from 20 mA to 200 mA. The current flowing through thyristor 13 is, for example, in the range from 10 mA to 100 mA. The voltage on node 17 thus progressively increases during step B'.

Similarly, at the end of the period of time for step B and at the beginning of the period of time for step A', the voltage on node 17 is substantially equal to the voltage on node 7, that is, voltage VDC. Further, the voltage across thyristor 15 is negative. In other words, the voltage on the cathode of thyristor 15 is greater than the voltage on the anode of thyristor 15.

During the period of time for step A', a positive current is injected into the gate of thyristor 15, which thus conducts a low current. The injected current is, for example, in the range from 20 mA to 200 mA. The current flowing through thyristor 15 is, for example, in the range from 10 mA to 100 mA. The voltage on node 17 thus progressively decreases during step B'.

Each step A period of time is thus followed, preferably directly, by a step B' period of time. Directly followed means that said step A and said step B' are not separated by a step B. Each step B period of time is followed, preferably directly, by a step A' period of time. Directly followed means that said step B and said step A' are not separated by a step A.

It could have been chosen not to carry out steps A' and B'. However, passing from step A to step B would cause a current peak on node 17, which might cause damage on the electronic components and electric disturbances on the mains.

Figure 4:
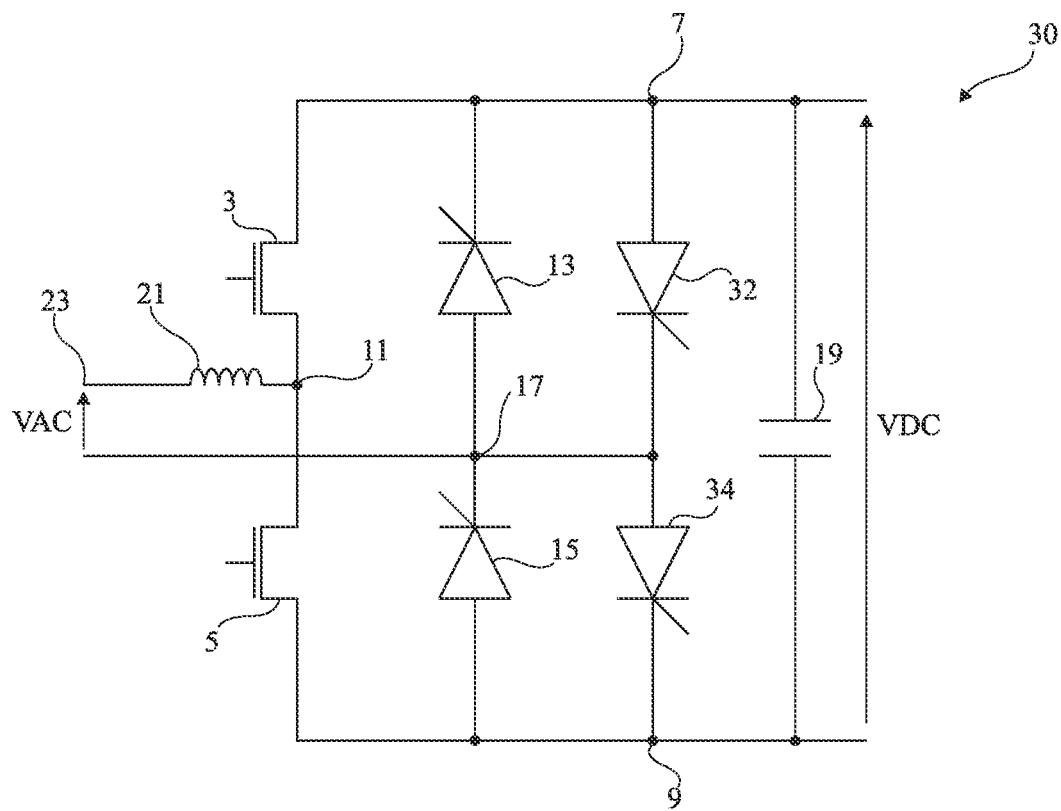
FIG. 4 shows another embodiment of a voltage converter.

FIG. 4 shows another embodiment of a voltage converter 30. Converter 30 is a bidirectional converter. Circuit 30 is, for example, a bidirectional power factor correction (PFC) circuit. Circuit 30 is, for example, a bidirectional "totem pole"-type power factor correction circuit. In other words, converter 30 is configured to convert the AC voltage into a DC voltage and the DC voltage into an AC voltage.

Converter 30 comprises the elements of converter 1. These elements, described in relation with FIG. 1, will not be described again.

Converter 30 further comprises two thyristors 32 and 34. Thyristors 32 and 34 are series-coupled between nodes 7 and 9. Thyristors 32 and 34 thus form another branch between nodes 7 and 9, in parallel with the branch comprising capacitor 19, with the branch comprising thyristors 13 and 15, and with the branch comprising transistors 3 and 5.

More precisely, thyristor 32 is coupled in parallel with thyristor 13. Thyristor 32 is coupled head-to-tail with thyristor 13. In other words, the anode of thyristor 32 is coupled, preferably connected, to node 7 and the cathode of thyristor 32 is coupled, preferably connected, to node 17.

Similarly, thyristor 34 is coupled in parallel to thyristor 15. Thyristor 34 is coupled head-to-tail to thyristor 15. In other words, the anode of thyristor 34 is coupled, preferably connected, to node 17 and the cathode of thyristor 34 is coupled, preferably connected, to node 9.

Node 17 is thus coupled, preferably connected, to the cathode of thyristor 15, to the cathode of thyristor 32, to the anode of thyristor 13, and to the anode of thyristor 34.

When circuit 30 operates in rectifying mode, the operation of circuit 30 is identical to the operation of the embodiment of FIG. 1 described in relation with FIGS. 2 and 3. Thyristors 32 and 34 are then off, for example, by supplying a zero current at the level of the gates of thyristors 32 and 34.

When circuit 30 operates in power inverter mode, that is, when a DC voltage is converted into an AC voltage, the method of controlling converter 30 comprises a step C period of time, during which the current I flowing through the inductor is positive, that is, flowing from node 23 to node 11.

During the period of time for step C, transistor 5 is on and transistor 3 is off. The current on the gate of thyristors 32 is, for example, greater than the gate trigger current (IGT), for example, in the order of 50 mA. The current on the gate of thyristors 13, 15, and 34 is, for example, substantially zero, which thus does not enable the current to flow through thyristors 13, 15, and 34. Thus, the current flows, from node 7, through thyristor 32, AC voltage source VAC, inductor 21, and transistor 5, to reach node 9.

The control method also comprises a step D period of time, during which the current I flowing through the inductor is negative, that is, flowing from node 11 to node 23.

During the period of time for step D, transistor 3 is on and transistor 5 is off. The current on the gates of thyristors 13, 15, and 32 is, for example, substantially zero, which thus does not enable the current to flow through thyristors 13, 15, 32. The current on the gate of thyristor 34 is, for example, greater than the gate trigger current (IGT), for example, in the order of 50 mA. Thus, the current flows, from node 7, through transistor 3, inductor 21, and thyristor 34, to reach node 9.

At the end of the step C period of time, the voltage on node 17 is substantially equal to the voltage on node 7, that is, voltage VDC. As in the case of step B, the step C period of time is, for example, followed by a step A' period of time, enabling to progressively decrease the voltage on node 17 and to avoid a current peak.

Similarly, at the end of the step D period of time, the voltage on node 17 is substantially equal to the voltage on node 9, that is, the reference voltage, for example, the ground. As in the case of step A, the step D period of time is, for example, followed by a step B' period of time, enabling to progressively increase the voltage on node 17 and to avoid a current peak.

According to an embodiment, the step C period of time is regularly followed, preferably directly, by a step A' period of time, for example, every 10 ms for a 50-Hz frequency. Directly followed means that the periods of time for said step C and said step A' are not separated by a step A, B, or D period of time. Similarly, the step D period of time is regularly followed, preferably directly, by a step B' period of time, for example every 10 ms for a 50-Hz frequency. Directly followed means that the periods of time for said step D and said step B' are not separated by a step A, B, or C period of time. In other words, the frequency of steps A' and B' is lower than the frequency of steps C and D.

For example, during a period of time T, each step C period of time is followed by a step E period of time during which transistor 5 is off and during which the current flows from node 7, through thyristor 32, AC voltage source VAC, inductor 21, and transistor 3, to return to node 7. Period of time T thus comprises a plurality of periods of time for steps C and E. At the end of each period of time T, the step C period of time is followed by a step A' of time. Period of time T is for example 10 ms for a 50-Hz frequency.

As a variant, thyristors 32 and 34 may be replaced with diodes or with transistors, for example MOSFET transistors, bipolar transistors, or IGBT transistors.

An advantage of the embodiment of FIG. 4 is that it enables to obtain a bidirectional converter without adding an insulated power supply circuit with respect to the embodiment of FIG. 1. Indeed, thyristors 15 and 32 have a common cathode, and may share the same power supply circuit. Further, thyristor 34 has its cathode coupled, preferably connected, to the node of application of the reference voltage and thus does not need a specific power supply circuit.

Another advantage of the described embodiments is that the current flowing through the thyristors during the periods of time for steps A' and B' is dependent on the current supplied on the gate. Thus, it is possible to select the growth or decrease speed of the voltage on node 17. According to the application, it is thus possible to select an appropriate tradeoff between the durations of the periods of time for steps A' and B' and the risk of a current peak capable of damaging the circuits and capable of generating electromagnetic noise.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

The invention claimed is:

1. A voltage converter, comprising:
a first transistor and a second transistor series-coupled at a first input node between a first output node and a second output node;
a first thyristor and a second thyristor series-coupled at a second input node between the first output node and the second output node;
wherein an input voltage is received at the first and second input nodes;
wherein the voltage converter is controlled so that:
during a first period of time, the first transistor and the second thyristor are on and the second transistor and the first thyristor are off;
during a second period of time, the first transistor and the second thyristor are off and the second transistor and the first thyristor are on;
during a third period of time following each first period of time where a voltage across the first thyristor is negative, the first and second transistors are off, and the second thyristor is off, a current is injected into a gate of the first thyristor to cause the first thyristor to conduct a reverse current flow from cathode to anode of the first thyristor; and
during a fourth period of time following each second period of time where a voltage across the second thyristor is negative, the first and second transistors are off, and the first thyristor is off, a current is injected into a gate of the second thyristor to cause the second thyristor to conduct a reverse current flow from cathode to anode of the second thyristor.

2. The converter according to claim 1, wherein the current injected into the gate of the first thyristor in the third period of time is in a range from 20 mA to 200 mA, and wherein the current injected into the gate of the second thyristor in the fourth period of time is in a range from 20 mA to 200 mA.

3. The converter according to claim 1, wherein a cathode of the first thyristor is coupled to the first output node and an anode of the first thyristor is coupled to the second input node and wherein a cathode of the second thyristor is coupled to the second input node and an anode of the second thyristor is coupled to the second output node.

4. The converter according to claim 3, wherein one conduction terminal of the first transistor is coupled to the first output node, another conduction terminal of the first transistor is coupled to the first input node, one conduction terminal of the second transistor is coupled to the first input node, and another conduction terminal of the second transistor is coupled to the second output node.

5. The converter according to claim 4, further comprising an inductor coupled between the first input node and a first supply node and where the second input node is connected to a second supply node.

6. The converter according to claim 5, wherein the input voltage is an AC voltage applied between the first and second supply nodes.

7. The converter according to claim 6, wherein the converter is configured so that a DC voltage is output between the first and second output nodes.

8. The converter according to claim 7, further comprising a capacitor coupled between the first and second nodes.

9. The converter according to claim 1, further comprising a third thyristor and a fourth thyristors series-coupled at the second input between the first output node and the second output node.

10. The converter according to claim 9, wherein a cathode of the third thyristor is coupled to the second input node and an anode of the third thyristor is coupled to the first output node and wherein a cathode of the fourth thyristor is coupled to the second output node and an anode of the fourth thyristor is coupled to the second input node.

11. The converter according to claim 10, wherein the voltage converter is controlled so that:
   during a fifth period of time, the second transistor and the third thyristor are on, and the first transistor and the first, second, and fourth thyristors are off; and
   during a sixth period of time, the first transistor and the fourth thyristor are on, and the second transistor and the first, second, and third thyristors are off.

12. The converter according to claim 11, wherein each fifth period of time is followed by the fourth period of time and each sixth period of time is followed by the third period of time.

13. The converter according to claim 12, wherein one conduction terminal of the first transistor is coupled to the first output node, another conduction terminal of the first transistor is coupled to the first input node, one conduction terminal of the second transistor is coupled to the first input node, and another conduction terminal of the second transistor is coupled to the second output node.

14. The converter according to claim 13, further comprising an inductor coupled between the first input node and a first supply node and where the second input node is connected to a second supply node.

15. The converter according to claim 14, wherein the input voltage is an AC voltage applied between the first and second supply nodes.

16. The converter according to claim 15, wherein the converter is configured so that a DC voltage is output between the first and second output nodes.

17. The converter according to claim 16, further comprising a capacitor coupled between the first and second nodes.

18. The converter according to claim 1, wherein the first and second transistors are MOSFET transistors.

19. A method of controlling a voltage converter that includes a first transistor and a second transistor series-coupled at a first input node between a first output node and a second output node, and a first thyristor and a second thyristor series-coupled at a second input node between the first output node and the second output node, the method comprising:
   during a first period of time, turning on the first transistor and the second thyristor and turning off the second transistor and the first thyristor;
   during a second period of time, turning off the first transistor and the second thyristor and turning on the second transistor and the first thyristor;
   during a third period of time following each first period of time where a voltage across the first thyristor is negative, turning off the first transistor and second transistor, turning off the second thyristor, and injecting a current into a gate of the first thyristor to cause the first thyristor to conduct a reverse current flow from cathode to anode of the first thyristor; and
   during a fourth period of time following each second period of time where a voltage across the second thyristor is negative, turning off the first transistor and second transistor, turning off the first thyristor, and injecting a current into a gate of the second thyristor to cause the second thyristor to conduct a reverse current flow from cathode to anode of the second thyristor.

20. The method according to claim 19, wherein the current injected into the gate of the first thyristor in the third period of time is in a range from 20 mA to 200 mA, and wherein the current injected into the gate of the second thyristor in the fourth period of time is in a range from 20 mA to 200 mA.

21. The method according to claim 19, wherein the converter includes a third thyristor and a fourth thyristor series-coupled at the second input between the first output node and the second output node, the method further comprising:
   during a fifth period of time that is followed by the fourth period of time, turning on the second transistor and the third thyristor, turning off the first transistor and turning on the first, second, and fourth thyristors; and
   during a sixth period of time that is followed by the third period of time, turning on the first transistor and the fourth thyristor, turning off the second transistor and turning off the first, second, and third thyristors.

* * * * *